United States Patent [19]

Takekoshi

[11] 4,024,110
[45] May 17, 1977

[54] METHOD FOR MAKING POLYETHERIMIDES

[75] Inventor: Tohru Takekoshi, Scotia, N.Y.

[73] Assignee: General Electric Company, Schenectady, N.Y.

[22] Filed: Dec. 5, 1975

[21] Appl. No.: 637,948

[52] U.S. Cl. .................. 260/47 CZ; 260/46.5 E; 260/46.5 UA; 260/47 R; 260/47 CP; 260/49; 260/50

[51] Int. Cl.$^2$ ................. C08G 65/42; C08G 73/10

[58] Field of Search ............ 260/47 CZ, 47 CP, 49, 260/50, 46.5 E, 46.5 UA, 47 R

[56] References Cited

UNITED STATES PATENTS

| | | |
|---|---|---|
| 3,787,364 | 1/1974 | Wirth et al. .................. 260/61 |
| 3,833,546 | 9/1974 | Takekoshi et al. ............ 260/47 CP |
| 3,847,870 | 11/1974 | Takekushi ..................... 260/47 CP |
| 3,850,885 | 11/1974 | Takekoshi et al. ............ 260/47 CZ |
| 3,852,242 | 12/1974 | White ............................. 260/47 CZ |
| 3,875,116 | 4/1975 | Heath et al. ................... 260/47 CP |
| 3,905,942 | 9/1975 | Takekoshi et al. ............ 260/47 CP |

*Primary Examiner*—Lester L. Lee
*Attorney, Agent, or Firm*—William A. Teoli; Joseph T. Cohen; Jerome C. Squillaro

[57] ABSTRACT

Polyetherimides can be made by effecting an interchange reaction, in the presence of an alkali phenoxide, between aryloxy-substituted bisphthalimide and dihydric phenol. The reaction can be conducted either under melt conditions or in the presence of a dipolar aprotic solvent.

8 Claims, No Drawings

METHOD FOR MAKING POLYETHERIMIDES

The present invention relates to a polymerization process for making polyetherimides based on an interchange reaction between phenoxy substituted bisphthalimide and dihydric phenol in the presence of an alkali phenoxide interchange catalyst.

Prior to the present invention, polyetherimides could be made by effecting an interchange reaction between a bis(chlorophthalimide) and an alkali diphenoxide in the presence of a dipolar aprotic solvent as shown by Wirth et al. U.S. Pat. No. 3,787,364 assigned to the same assignee as the present invention. Although such interchange reactions provide valuable results, metal salts are formed as by-products which must be removed. In addition, such interchange reactions require the use of expensive organic solvents which can lead to pollution. It would be desirable, therefore, to be able to fabricate polyetherimides without having to use an expensive dipolar aprotic solvent. It would also be desirable in instances where a solvent is used to make such polyetherimides, to eliminate certain intermediates for polyetherimide formation which invariably result in the production of metal salts or other non-volatile by-products.

The present invention is based on the discovery that moldable polyimides can be made under melt conditions or in the presence of a dipolar aprotic solvent by effecting an interchange reaction between phenoxy substituted bisphthalimides and dihydric phenols in the presence of an alkali phenoxide interchange catalyst. As a result, there is no generation of non-volatile by-products during the interchange reaction.

There is provided by the present invention, a method for making polyetherimides which comprises effecting the removal, at temperatures up to 350° C, of monohydric phenol of the formula,

ROH       (I)

from a mixture comprising

A. an aryloxy-substituted bisphthalimide of the formula,

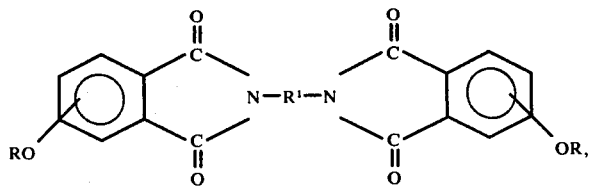

B. a dihydric phenol of the formula,

HOR²OH       (III)

and

C. an effective amount of an alkali phenoxide of the formula,

R³(OM)n       (IV)

where R is a monovalent aromatic organic radical having from 6–13 carbon atoms, R¹ is a divalent organic radical selected from $C_{(6-13)}$ aromatic radicals, $C_{(2-20)}$ alkylene radicals, $C_{(3-8)}$ cycloalkylene radicals, and $C_{(2-8)}$ alkylene terminated polydiorganosiloxane radicals, R² is a divalent aromatic organic radical having from 6–30 carbon atoms, R³ is selected from R, R², and trivalent aromatic radicals, M is an alkali metal, and $n$ is an integer having a value of 1 to 3 inclusive.

Radicals included by R are, for example, phenyl, tolyl, xylyl, naphthyl, etc. Radicals included by R¹ are, for example, divalent aromatic hydrocarbon radicals and halogenated aromatic hydrocarbon radicals, for example, phenylene, tolylene, chlorophenylene, naphthalene, etc., and radicals included by the formula,

where R⁴ is a divalent aromatic radical having from 6–13 carbon atoms selected from hydrocarbon radicals and halogenated hydrocarbon radicals, for example, phenylene, xylylene, etc., Q is a divalent radical selected from

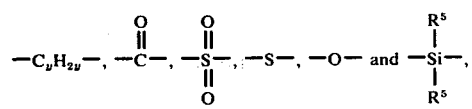

where $a$ is 0 or 1, $y$ is an integer having a value of from 1–5 inclusive, and R⁵ is a monovalent hydrocarbon radical selected from methyl, phenyl, and vinyl. Radicals included by R² are, for example,

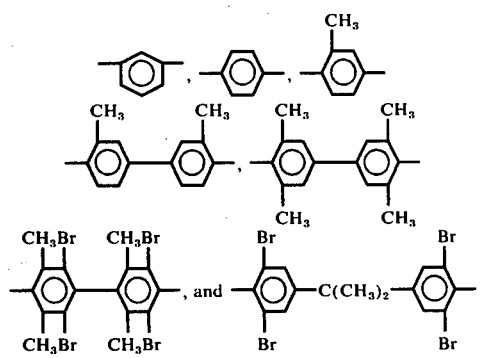

and b. divalent organic radicals of the general formula, (II)

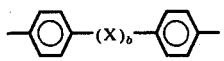

where X is a member selected from the class consisting of divalent radicals of the formulas,

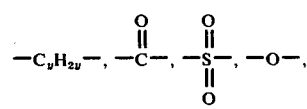

and —S—, where $b$ is 0 or 1, $y$ is a whole number from 1 to 5.

Radicals included by $R^1$ are, for example,

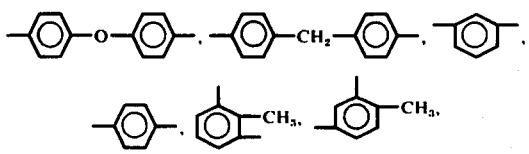

etc.; alkylene radicals such as hexamethylene, etc., cyclohexylene, etc.;

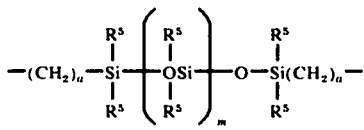

where $R^5$ is defined above, $m$ is an integer equal to 0 to 100 inclusive, and $a$ is an integer equal to 2 to 8 inclusive.

Radicals included by $R^3$ are the aforementioned R and $R^2$ radicals and trivalent radicals, such as $(C_{6-20})$ aromatic hydrocarbon radicals.

The bisimides of formula II can be made by effecting reaction in a dipolar aprotic organic solvent between the monohydric phenol of formula I, and about 0.5 mol, per mole of such monohydric phenol of dinitro bisimide of the formula,

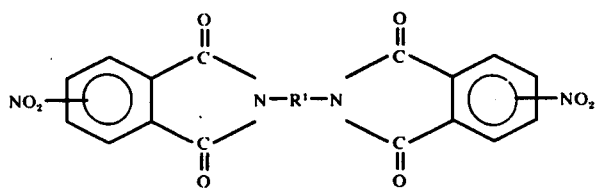

(V)

where $R^1$ is as previously defined. The dinitro-bisimides of formula V and methods for making are shown by Wirth et al. U.S. Pat. No. 3,838,097, assigned to the same assignee as the present invention. Organic diamine, $NH_2R^1NH_2$, and a mixture of about two molar amounts of 3-nitrophthalic anhydride and/or 4-nitrophthalic anhydride is reacted in glacial acetic acid and the mixture refluxed for 2–12 hours.

Included by the organic diamines which can be used to make the dinitro-bisimide of formula V, are for example
m-phenylenediamine;
p-phenylenediamine;
2,4-diaminotoluene;
4,4'-diaminodiphenyl;
3,3'-diaminobenzophenone;
2,2-bis(4-aminphenyl)propane;
bis(4-aminphenul)methane;
bis(4-aminphenyl)ether;
bis(4-aminophenyl)sulfone;
bis(4-aminophenyl)sulfide;
bis(3-aminophenyl)sulfone;
1,5-diaminonaphthalene.

In the practice of the invention, a mixture of substantially equal molar amounts of the aryloxy substituted bisphthalimide of formula II, or "bisimide" and the bisphenol of formula III is heated under an inert atmosphere such as nitrogen in the presence of an effective amount of the alkali phenoxide of formula IV.

The polymerization can be carried out under reduced pressure, such as from 5 to 300 torr, to facilitate separation of phenol, while minimizing the loss of bisphenol. If desired, an excess amount of bisphenol can be used, such as from 1 to 4 moles of bisphenol, per mole of bisimide. Under such conditions, all phenol is displaced by the bisphenol. The excess bisphenol can be readily eliminated under reduced pressure, such as from 10 to 0.01 torr, along with agitation, such as stirring, by the use of an inert gas purge.

Temperatures of from 200° to 350° C can be used. In instances where solution polymerization is employed, a temperature of about 130° to 250° C can be used, depending upon the pressure and dipolar aprotic solvent used. Suitable solvents include, for example, N-methylpyrrolidone, dimethylsulfoxide, hexamethylphosphoramide, etc.

Amounts of alkali phenoxide which can be employed are from 0.1 to 10% by weight of the alkali phenoxide, based on the total weight of the reaction mixture.

In order that those skilled in the art might be better able to practice the invention, the following examples are given by way of illustration and not by way of limitation. All parts are by weight.

EXAMPLE 1

A mixture of 46.04 parts of 4,4-bis(3-nitrophthalimid)diphenyl methane 150 parts of toluene and 50 parts of N,N-dimethylformamide was stirred under nitrogen at 65° C. Anhydrous sodium phenoxide (19.49 parts) was added over a period of 15 minutes. After the addition was complete, the mixture was further heated at 75° C for 0.5 hours. The mixture was then added to 2000 parts of water. There was obtained 50.25 parts of a crystalline product after the precipitate was collected and dried. The product had a melting point of 229.5° – 231° C. after it was recrystallized from chlorobenzene. Based on method of preparation and its infrared spectrum, the product was a phenoxy substituted bisphthalimide of the formula:

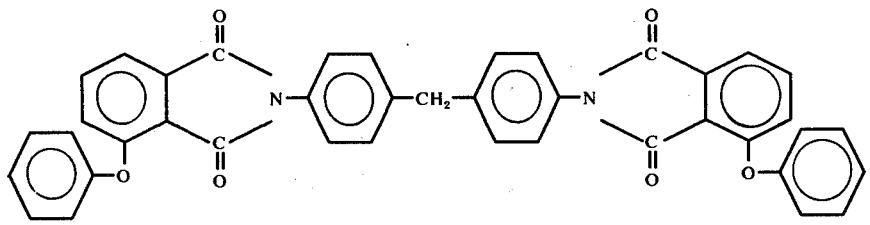

Following the same procedure, there were made other aryloxy substituted bisphthalimides which are shown below in Table I.

finely divided glass fiber. There is obtained a composite upon evaporation of solvent. The composite is readily shaped by heat and pressure to a finished part.

Table I

| Bisphthalimide | R | Ring Position of RO | R¹ | Yield (%) | M.P. (° C) |
|---|---|---|---|---|---|
| 1 | Phenyl | 3 | 4,4'-diphenylmethane | 93.6 | 229.5–231 |
| 2 | Phenyl | 3 | 4,4'-diphenyl ether | 92.0 | 186–187 |
| 3 | Phenyl | 3 | 1,3-phenylene | 97.8 | 220–221 |
| 4 | Phenyl | 4 | 4,4'-diphenyl ether | 93.0 | 244–245 |
| 5 | p-chlorophenyl | 4 | 4,4'-diphenyl ether | 95.1 | 279.280 |
| 6 | Phenyl | 4 | 1,3-phenylene | 95.6 | 176–177 |
| 7 | p-chlorophenyl | 4 | 1,3-phenylene | 84.2 | 249–250 |

A mixture of 4.69 parts of bisphthalimide I of Table I, 1.36 part of 4,4'-dihydroxybiphenyl and 0.008 part of sodium phenoxide was heated under a nitrogen atmosphere. The temperature was maintained at 250° C. A light amber melt was obtained. The pressure of the mixture was reduced to 50 mm. and the temperature increased to 300° C over 0.5 hour. Phenol was continuously distilled during this period. There was obtained 4.1 parts of a polyetherimide having an intrinsic viscosity in dimethyl formamide of 0.20 at 20° C. Based on method of preparation, the polyetherimide had the average formula

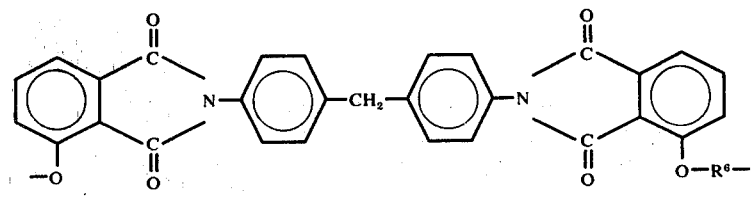

where R⁶ is

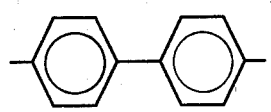

A dimethylformamide solution of the above polyetherimide is blended with equal parts by weight of

EXAMPLE 2

A mixture of 4.824 parts of the bisphthalimide I of Table I, 1.548 parts of 4,4'-dihydroxydiphenyl ether and 0.059 part of sodium phenoxide was heated for 10 minutes at 250° C under nitrogen to produce a homogeneous melt. The pressure was reduced to 50 torr and the temperature raised to 280° C over a period of 0.5 hours. During this period, 1.12 parts of phenol was collected. The pressure was then reduced to about 0.4 torr and the mixture was heated for an additional 45 minutes. Agitation of the mixture was achieved during polymerization with a stream of nitrogens. On cooling, there was obtained a 4.56 parts of an amber colored polymer having an intrinsic viscosity of 0.21 in dimethyl formamide at 250° C.

Based on method of preparation and its infrared spectrum, the product was a polyetherimide consisting essentially of the following chemically combined units.

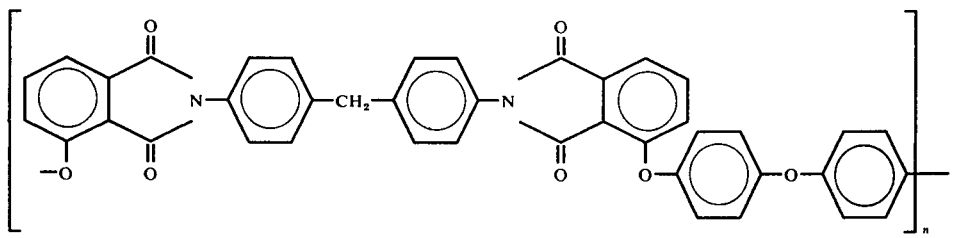

where *n* is a positive integer

EXAMPLE 3

In accordance with the procedure of Example 1, a mixture of 5.1788 parts of 4,4'-bis[N-3-phenoxyphthalimido]-diphenyl methane, 1.87 parts of 2,2-bis(4-hydroxyphenyl)-propane and 0.038 part of sodium phenoxide was stirred and heated at 265° C. Polymerization was conducted under a nitrogen atmosphere at a pressure of about 70 torr. A homogeneous melt formed. The pressure was reduced over a period of 50 minutes to 5 torr to effect the distillation of phenol. The viscous melt was further stirred at 285° C and 0.5 torr for an additional 50 minutes to remove excess bisphenol. There was obtained 4.8 parts of product, having an intrinsic viscosity of 0.2 in dimethyl formamide at 25° C. Based on method of preparation and its data, the polymer was a polyetherimide having the formula,

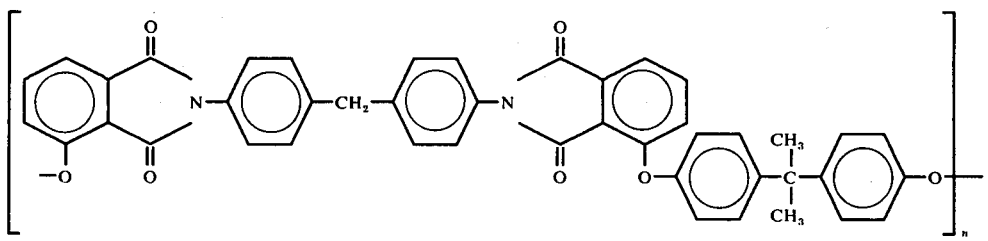

where *n* is a positive integer

EXAMPLE 4

A mixture containing 2.855 parts of 1,3-bis(4-phenoxyphthalimido)benzene, 1.180 part of Bisphenol A, 0.081 part of o-phenylphenol sodium salt and 20 parts of N-methylpyrrolidone was heated to reflux under nitrogen atmosphere. The heating was continued for 1 hour during which time an approximate total of 10 parts of liquid was distilled off. The reaction mixture was cooled and poured into about 300 parts of methanol which was stirred in a blender. A white polymer precipitated. The polymer was filtered, washed and dried under vacuum. The yield was approximately 2.0 parts. The intrinsic viscosity of the polymer was 0.1 dl/g in methylene chloride. Based on the method of preparation and its infrared spectrum, the polymer was a polyetherimide having the following formula.

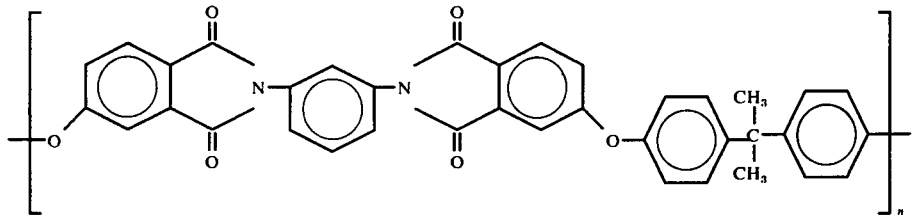

where *n* is a positive integer

EXAMPLE 5

A mixture of 3.120 parts of bisphthalimide 6 of Table I, 0.052 part of the disodium salt of Bisphenol A and 10 parts of dimethylsulfoxide was stirred and heated at about 160° under nitrogen. The pressure was reduced to around 160 torr and 10 parts of a dimethylsulfoxide solution containing 1.289 part of Bisphenol A was added dropwise over a period of one hour while an approximate total of 10 parts of liquid was simultaneously distilled off through a distillation adaptor. The reaction mixture was cooled and poured into 300 parts of methanol. A product precipitated which was filtered and dried. Analysis: Calculated for $C_{37}H_{24}N_2O_6$, C 74.98, H 4.08, N 4.73. Found: C 73.9, H 3.9, N 4.73.

Based on the method of preparation and the above elemental analysis, the product was a polyetherimide having the structure identical to the polymer obtained in Example 4.

EXAMPLE 6

A mixture of 2.336 parts of 4,4'-bis(3-phenoxyphthalimido)diphenyl ether, 0.10 part of o-phenylphenol potassium salt and 10 parts of dimethylsulfoxide was stirred and heated to reflux under a pressure of approximately 200 torr. A solution of 0.791 part of 4,4'-dihydroxydiphenylsulfide in 8 parts of dimethylsulfoxide was added dropwise to the above reaction mixture over a period of one hour during which time approximately 10 parts of liquid was concurrently distilled off. The reaction mixture was poured into methanol and 2 parts of a white precipitate was isolated.

Based on the method of preparation and elemental analysis, the product was a polyetherimide having the average formula

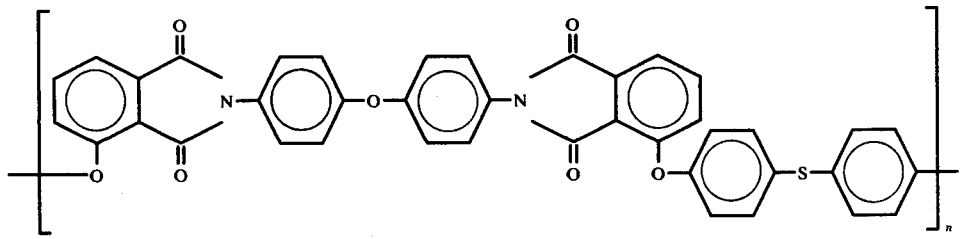

Although the above examples are limited to only a few of the very many variables included by the method of the present invention, it should be understood that the present invention is broadly directed to the production of polyetherimides involving the reaction of bisphthalimide of formula II and dihydric phenol of formula III in the presence of alkali phenoxide of formula IV.

What I claim as new and desire to secure by Letters Patent of the United States is:

1. A method for making polyetherimides which comprises,
    1. effecting the removal at temperatures up to 350° C of monohydric phenol of the formula,

ROH, from a mixture comprising,
    A. a bisimide of the formula,

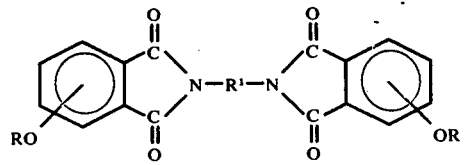

B. a dihydric phenol of the formula,

HOR$^2$OH, and

C. an alkali phenoxide of the formula,

R$^3$(OH)$n$, where there is used from 1 to 4 mols of (A) per mole of (B) and from 0.1 to 10% by weight of (C), based on the weight of (A), (B) and (C), R is a monovalent aromatic organic radical having from 6–13 carbon atoms, R$^1$ is a divalent organic radical selected from C$_{(6-13)}$ aromatic radicals, C$_{(2-20)}$ alkylene radicals, C$_{(3-8)}$ cycloalkylene radicals, and C$_{(2-8)}$ alkylene terminated polydiorganosiloxane radicals, R$^2$ is a divalent aromatic organic radical having from 6–30 carbon atoms, R$^3$ is an aromatic radical selected from R, R$^2$ and trivalent aromatic hydrocarbon radicals, M is an alkali metal and $n$ is an integer equal to 1 to 3 inclusive.

2. A method in accordance with claim 1, where the polymerization is conducted in the presence of a dipolar aprotic solvent.

3. A method in accordance with claim 1, where the polymerization is conducted in the melt.

4. A method in accordance with claim 1, where the dihydric phenol is 2,2-bis(4-hydroxyphenyl)-propane.

5. A method in accordance with claim 1, where the monohydric phenol is hydroxybenzene.

6. A method in accordance with claim 1, where R$^1$ is 1,3-phenylene radical.

7. A method in accordance with claim 1, where R$^1$ is 4,4'-diphenyl ether radical.

8. A method in accordance with claim 1, where compound HO—R$^2$—OH is 4,4'-dihydroxydiphenyl sulfide.

* * * * *